May 10, 1932.  C. E. STROBURG ET AL  1,857,484
CORNER PLOW
Filed April 6, 1931
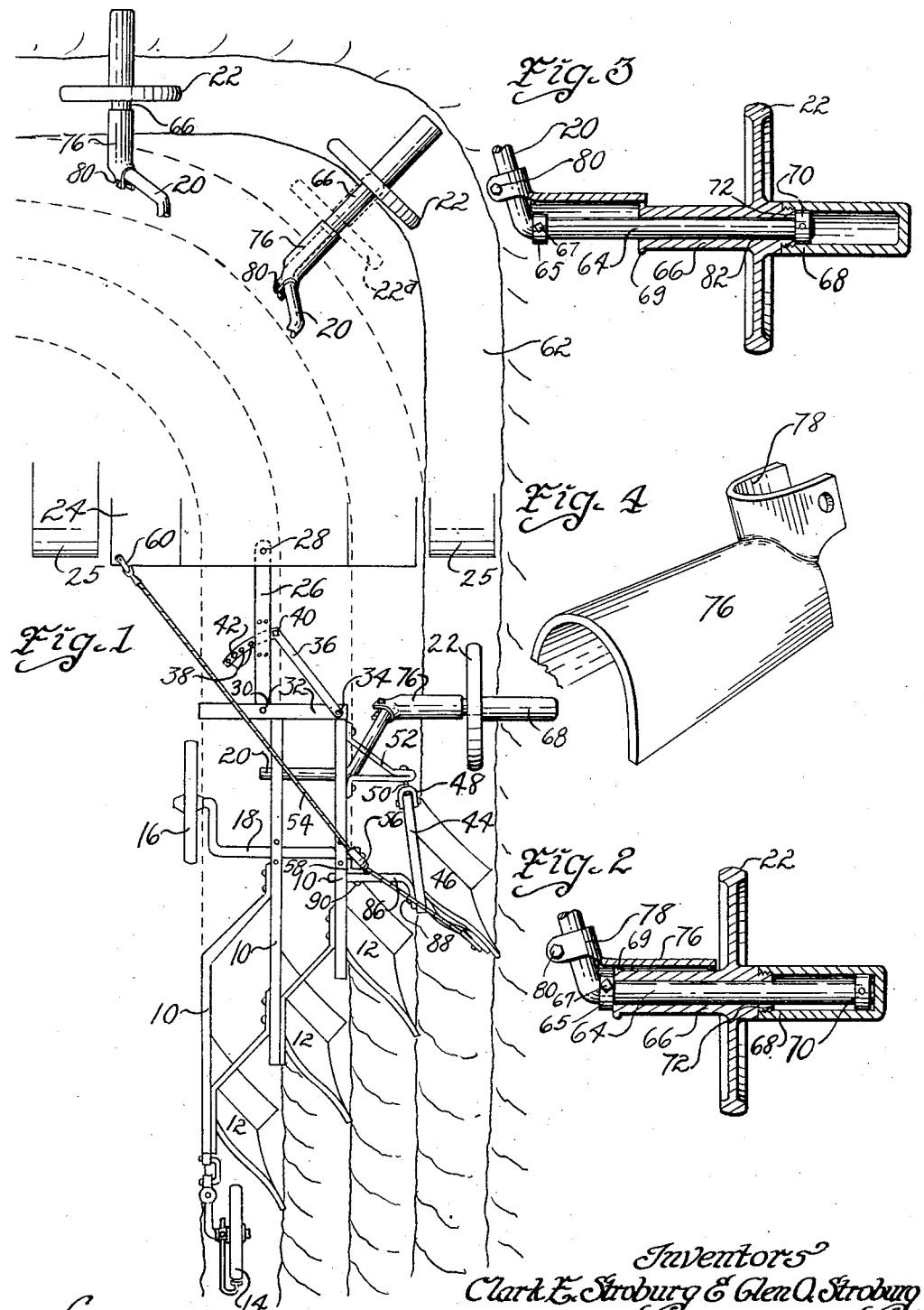
Inventors
Clark E. Stroburg & Glen Q. Stroburg
by Bair, Freeman & Sinclair
Attorneys
Witness
Ray A. Wilson Patented May 10, 1932

1,857,484

UNITED STATES PATENT OFFICE

CLARK EMIL STROBURG AND GLEN ORTA STROBURG, OF BLOCKTON, IOWA

CORNER PLOW

Application filed April 6, 1931. Serial No. 528,088.

This invention relates to an improvement in corner plows of the character described and claimed in Letters Patent of the United States, No. 1,787,800, granted to us on January 6th, 1931, and its primary purpose is to provide an improved method of mounting the furrow wheel of the plow in order to secure more effective operation of the corner plow attachment.

A further object of the invention is to provide improved means for mounting the corner plow attachment on the plow frame and for operatively connecting it to a tractor by which the plow is to be drawn.

With these and other objects in view our invention consists in the construction, arrangement and combination of the various parts of our device, whereby the objects contemplated are attained, as hereinafter more fully set forth, pointed out in the claims, and illustrated in the accompanying drawings, in which:—

Figure 1 is a plan view of an improved corner plow embodying our invention and illustrating the furrow wheel in various positions which it may assume on a straightaway course and in making a turn.

Figure 2 is an enlarged sectional view illustrating a special form of furrow wheel which preferably is used with the corner plow, the wheel in this view being shown in its normal position.

Figure 3 is a similar view showing the furrow wheel in its position assumed in making a turn.

Figure 4 is a perspective view of a hood for shielding the hub and axle of the slidably mounted furrow wheel.

The type of plow to which this invention relates is a gang plow especially designed for use with a tractor and having an attachment in the nature of an extra plow bottom for plowing the corner of a field in making a turn. This extra plow bottom, which is designated as a corner plow, is held in elevated position during such time as the tractor and plow are following a straightaway course and connected in such manner to the tractor that during the making of a turn it is lowered for operation to facilitate the plowing of corners which cannot ordinarily be accomplished by tractor drawn plows.

The frame of the gang plow includes a plurality of plow beams 10, in this instance three in number, and each carrying a plow bottom 12. The frame is supported by a caster wheel 14 and a land wheel 16, which is rotatably mounted on a drop axle 18. There is also another drop axle 20 for the furrow wheel, which is designated by the numeral 22.

The gang plow is adapted to be drawn by a tractor, a small portion of which is shown. The platform of the tractor for instance is designated by the numeral 24, and the rear wheels thereof by the reference numeral 25. A suitable hitch device is provided for attachment to the follower machine such as the gang plow. The hitch device here shown includes a draw bar 26 pivoted to the tractor at 27 and having a pivotal connection at 30 to a cross member 32 attached to the plow frame. To one end portion of the cross member 32 is pivotally attached at 34 an inclined brace 36 which is bent laterally at its forward end and provided with a plurality of bolt holes 38. The laterally extending portion of the brace 36 extends across the draw bar 26 which may be confined at times against swinging movement by mounting bolts 40 and 42 through holes 38 on opposite sides of and close to the draw bar. This arrangement of the parts is especially desirable for traveling on the road. For the plowing operation, however, the bolts 40 and 42 preferably are spaced apart a material distance in order to permit the draw bar 26 to swing on its pivots particularly when the tractor and follower machine are making a decided turn to the left.

The corner plow attachment includes a plow beam 44 carrying a bottom 46. A clevis 48 is pivotally connected to the forward end of the beam 44 and is provided with a stem 50 extending loosely through a horizontal opening in a laterally extending bracket 52 carried by a portion of the plow frame.

Fixed to the corner plow bottom 46 is a flexible connecting member such as a cable 54 which extends forwardly and laterally and over a pulley 56 carried in an elevated position as by a post 58 attached to the plow frame. The cable 54 thence extends downwardly and forwardly on an inclined line, whereby it crosses from the right hand to the left hand side of the machine and is attached at its forward end as by a clevis 60 to the left rear side of the platform 24 of the tractor.

The length of the flexible connecting member 54 between its two points of attachment, namely to the bottom 46 and the tractor 24, is such that it does not permit the pivoted corner plow to be lowered to operative position during such time as the tractor and plow are traveling in a straight line. Its length is such, however, that when the tractor makes a turn to the left, as indicated in Figure 1, the corner plow 46 is lowered to operative position by slacking of the cable 54, through pivotal movement of the parts of the draw bar.

The pivotal movement of the corner plow attachment is permitted by the flexible or swivel connection of its beam 44, through the clevis 48, stem 50 and bracket 52. It is obvious that when the plow 46 is in lowered position it will operate to plow the corner portions of the field which cannot ordinarily be reached by the plows of the gang.

It is obvious that when the corner has been completed the plow 46 will be raised to inoperative position by a straightening out of the tractor hitch and plow frame, which thus exert a draft on the flexible member 54.

During operation of the plow the furrow wheel 22 travels in the last furrow made by the plow in a preceeding round of the field, such a furrow being designated in Figure 1 by the numeral 62. When rounding a corner, however, the furrow wheel, if mounted in the ordinary manner, would ride out of the furrow 62 and travel on the unplowed land as indicated by dotted line position 22a in Figure 1. This is because its normal position would not permit the furrow wheel to reach and travel in the furrow on the curved part.

The travel of the furrow wheel in rounding a corner, if it were permitted to ride up on the unplowed land, would interfere with the proper action of the corner plow attachment because it would tend to elevate the bottom 46 sufficiently that it would not plow the corner.

To overcome this difficulty, we have devised an improved method of mounting the furrow wheel to permit it to slide outwardly at times to remain in the furrow while rounding a corner.

To accomplish this end the drop axle 20 is formed with an elongated spindle designated by the numeral 64 and the furrow wheel 22 is provided with a hub which is elongated in both directions from the plane of the wheel. The inner end portion 66 of the hub fits snugly on the spindle 64 while the outer end portion of the hub 68 is of enlarged diameter in order that it may receive a stop collar 70 mounted on the end of the spindle.

During straight ahead travel the wheel 22 will usually remain close to the drop portion of the axle 20 as indicated in Figure 2, in which position the stop collar 70 is close to the outer end of the enlarged portion 68 of the hub.

At times, however, the wheel 22 may slide outwardly on the spindle 64 as shown in Figure 3 to such extent that the stop collar 70 engages the shoulder 72 formed between the two portions 66 and 68 of the hub, thereby providing a stop for the outward sliding movement. This permits the wheel 22 to travel at all times in the furrow 62 to permit effective operation of the corner plow 46.

A hood 76, substantially semi-cylindrical in form preferably is provided for covering the inner end portion of the spindle 64 and protecting it from dirt and other foreign substances. The hood 76 is formed at its inner end with a U-shaped sleeve 78 adapted to embrace the vertical part of the top axle 20 and be clamped thereto as by a bolt 80. The hood 76 is of sufficient length to slightly overlap the inner end portion of the hub member 66 when the wheel 22 is at its outward limit of movement. An adjustable stop collar 65 is held by a set screw 67 on the spindle 64 to limit inward movement of the wheel 22. An annular rib 69 on the hub member 66 prevents dirt from working along this hub member and onto the spindle 64 when the wheel 22 is in the position shown in Figure 3.

It will be observed that the hub member 68 is closed at its outer end to further prevent the entrance of dirt to the hub and spindle. In order to permit access to the pin 82 which holds the stop collar 70 in place, the hub member 68 is screwed onto the hub member 66.

To assist in maintaining the corner plow in proper position we have provided a brace 86 attached at 88 to the rear end portion of the plow beam 44. The brace 86 extends laterally and forwardly and is bent between its ends whereby its forward portion extends in a plane substantially at right angles to the lower end of the post 58 to which it is pivoted, as by a bolt 90. The brace 86 projects beyond its pivot 90 and beneath the adjacent plow beam 10, which acts as a stop to limit the downward pivotal movement of the main portion of the brace and to prevent it from passing below a substantially horizontal position when the corner plow moves to operative position.

Our present invention is an improvement over the corner plow disclosed by our patent above referred to in several particulars, such as the sliding arrangement of the furrow wheel, the method of attaching the corner plow beam 44 to the plow frame by means of the clevis and bracket, and also the method of directly connecting the cable 54 to the corner of the tractor.

Some changes may be made in the construction and arrangement of the various parts of our device without departing from the real spirit and purpose of our invention, and it is our purpose to cover by our claims, any modified forms of structure or use of mechanical equivalents, which may be reasonably included within their scope.

We claim as our invention:—

1. An improvement in corner plows of the type having a plow bottom held in elevated position during straightaway travel and adapted to be automatically lowered while rounding a corner, said improvement consisting of a slidably mounted furrow wheel for the plow frame, arranged in advance of the corner plow bottom, and capable of lateral sliding movement whereby it may remain in and follow a furrow throughout a turn of the plow.

2. In a plow of the character described, an axle having an elongated spindle, and a wheel having an elongated hub slidably and rotatably mounted on said spindle for the purposes stated.

3. In a plow of the character described, an axle having an elongated spindle, a stop member at the outer end of said spindle, and a wheel having a hub elongated on both sides of the wheel, the inner end portion of the hub fitting snugly and slidably engaging said spindle and the outer end portion being enlarged in diameter to accommodate said stop member.

4. In a plow of the character described, an axle having an elongated spindle, a wheel having an elongated hub slidably and rotatably mounted on said spindle for the purposes stated, and a hood carried by said axle, overlying and partially embracing that portion of the spindle exposed by outward sliding movement of the wheel.

5. A corner plow attachment for a gang plow drawn by a tractor, comprising a plow beam pivotally mounted at its forward end on the gang plow frame and carrying a corner plow, and a flexible member attached at one end to said plow beam and extending laterally and forwardly toward an outer rear corner of the tractor, means for attaching said flexible member directly to said outer rear corner of the tractor to prevent longitudinal movement of said member with respect thereto, said flexible member being of such length that the corner plow is held thereby in elevated position while the tractor and gang plow are traveling forwardly and that said corner plow is permitted to move downwardly to operative position while the tractor is turning a corner in one direction.

6. A gang plow having a frame, a bracket on and extending laterally of said frame, and a corner plow attachment including a beam with a plow bottom thereon, a clevis pivoted on the forward end of said beam, said clevis having a stem extending loosely through said bracket for pivotally connecting the attachment to the plow frame, and a flexible connecting member engaging said attachment for normally holding said bottom in elevated position.

Executed at Blockton, county of Taylor, and State of Iowa, this 3rd day of April, 1931.

CLARK EMIL STROBURG.
GLEN ORTA STROBURG.